United States Patent [19]

Kroll et al.

[11] Patent Number: 5,258,906
[45] Date of Patent: Nov. 2, 1993

[54] SYSTEM FOR REMOTELY AUTHORIZING OPERATION OF A DEVICE AND FOR AUTOMATICALLY GENERATING AN INVOICE BASED ON DEVICE USAGE

[75] Inventors: Mark W. Kroll, Minnetonka; Mark R. Pommrehn, Eden Prairie, both of Minn.

[73] Assignee: Vital Heart Systems, Inc.

[21] Appl. No.: 600,251

[22] Filed: Oct. 18, 1990

Related U.S. Application Data

[63] Continuation-in-part of Ser. No. 218,641, Jul. 13, 1988, abandoned.

[51] Int. Cl.⁵ .................. G06F 15/22; G06F 15/00
[52] U.S. Cl. .................................. 364/401; 364/406; 379/98
[58] Field of Search ............ 364/401, 406, 479, 413.01; 379/98, 106, 107; 235/379, 380

[56] References Cited

U.S. PATENT DOCUMENTS

| | | | |
|---|---|---|---|
| 3,716,697 | 2/1973 | Weir | 235/383 |
| 4,199,100 | 4/1980 | Wostl et al. | 235/381 |
| 4,319,128 | 3/1982 | Dow, Jr. et al. | 235/61 PD |
| 4,447,890 | 5/1984 | Duwel et al. | 364/900 |
| 4,482,964 | 11/1984 | Berstein et al. | 364/465 |
| 4,511,970 | 4/1985 | Okano et al. | 364/401 |
| 4,593,376 | 6/1986 | Volk | 364/479 X |
| 4,679,142 | 7/1987 | Lee | 364/406 |
| 4,689,757 | 8/1987 | Downing et al. | 364/550 |
| 4,777,354 | 10/1988 | Thomas | 235/380 |
| 4,787,045 | 11/1988 | Storace et al. | 364/464.02 |
| 4,796,181 | 1/1989 | Wiedemer | 364/406 |
| 4,817,044 | 3/1989 | Ogren | 364/550 |

Primary Examiner—Roy N. Envall, Jr.
Assistant Examiner—Frantzy Poinvil
Attorney, Agent, or Firm—Joel D. Skinner

[57] ABSTRACT

A method and device for automatically metering, invoicing, and crediting the user of an apparatus located at a remote location. The method provides an authorization code to the apparatus issued by the owner and which enables the apparatus for a predetermined time period. At least one operation parameter is determined with respect to the use of the apparatus during the predetermined time period and an invoice is provided at the apparatus location. The invoice indicates the operation parameter and further indicates a fee based on the operation parameter. The device comprises a central processing unit for reception of the authorization code and a code verification system. The code verification system authorizes usage of the apparatus for a predetermined time period. The central processing unit determines at least one operation parameter during the predetermined time period and provides an invoice to the user.

21 Claims, 3 Drawing Sheets

SYSTEM FOR REMOTELY AUTHORIZING OPERATION OF A DEVICE AND FOR AUTOMATICALLY GENERATING AN INVOICE BASED ON DEVICE USAGE

This is a continuation-in-part of application Ser. No. 07/218,641, filed Jul. 13, 1988, now abandoned.

BACKGROUND OF THE INVENTION

This invention relates to metering systems and, more particularly, to methods and devices for measuring the usage of an apparatus and for automatically invoicing and crediting the user. The device and method of the present invention are particularly useful for determining the number of diagnostic or therapeutic operations performed on a medical apparatus located at a remotely located medical facility and for automatically invoicing the user based on those operations.

The development of new and complex apparatus and processes and their use at remote locations poses unique problems to owners of these systems. An owner often desires to base remuneration on actual apparatus usage, and, therefore, it has become increasingly important to meter or otherwise account for the discreet operation cycles of these various systems and apparatus. It is often desirable to invoice users based on these discreet operation cycles, for example, on a per use basis.

The metering systems of this invention provide the medical apparatus owner, for example, with the ability to control, monitor and invoice the use of the apparatus at a remote location. And, these benefits are provided without direct connection to the remote location and without the addition of equipment.

In the past, metering devices have been used and proposed to determine the amount of usage for various systems and apparatus. Specifically, such metering devices have been utilized in the retail merchandising field and in gasoline service stations. However, these devices typically require operator supervision as opposed to being fully automatic. Other prior art metering devices are complex and require additional equipment to be added to the apparatus being monitored, for example, a second printer or an operator monitoring device. Still other metering devices are not useable between remote locations. Finally, some prior art devices are unsuitable for use in the medical environment where safety is an important factor.

Despite the need for a metering device and method in the art which is accurate and amenable to use in the medical field, and which overcomes the limitations and problems of the above mentioned prior art, none insofar as is known has been proposed or developed.

Accordingly, it is an object of the present invention to provide an automatic metering and invoicing system which is useable with a medical apparatus and which requires no direct connection with the location of the invoicing entity. A further object of this invention is to provide a metering, control and invoicing system which avoids the requirement of inperson contact with the apparatus being monitored by personnel from the invoicing entity. Another object of this invention to provide a system which yields automatic invoicing and crediting of the user account directly on the user premises.

SUMMARY OF THE INVENTION

The present invention provides a device and method for automatically invoicing and crediting the user of a system, such as a medical diagnostic or therapeutic apparatus, from a location remote from the system. The method of this invention comprises the steps of first providing an authorization code to the medical apparatus from the invoicing entity premises. Secondly, the authorization code is verified or confirmed at the location of the medical apparatus (remote or user premises). The verified authorization code allows the medical apparatus to operate during a predetermined period of time. Thirdly, operation parameters of the medical apparatus are determined based on its use during the predetermined time period. Finally, an invoice is provided at the user premises. The invoice indicates the specified operation parameters and also indicates a fee based on one or more of the operation parameters. Payment of the invoice by the user will yield another authorization code for additional medical apparatus use. Importantly, the invoice is provided utilizing the output devices of the medical apparatus itself.

The automatic metering and invoicing device of the present invention is for use with a system, such as a medical diagnostic or therapeutic apparatus, having a central processing unit and a printer. The device of the invention comprises means to receive an authorization code and means to confirm the authorization code. The confirmation means is connected to the reception means. The confirmation means authorizes usage of the medical apparatus for a predetermined time period based on the confirmed authorization code. The device has means, connected to the medical apparatus, to determine at least one operation parameter subsequent to the predetermined time period. The device further has means, connected to the determination means and to the medical apparatus printer, to automatically provide an invoice via the apparatus printer indicating the operation parameter and a fee based thereon.

Another embodiment of the device of the present invention comprises a main station which is located at the invoicing entity and a remote station located at the user premises and connected to the medical apparatus. The main station has a control unit for outputting an authorization signal, a keyboard which is connected to the control unit to allow an operator to control the system, and a transmission link for transmitting the authorization signal over a telephone line.

The remote station has a reception link which is connectable to the transmission link of the main station through the telephone line, a microprocessor based control unit which is connected to the reception link, storage means connected to the control unit, and a serial link connected to the control unit and also to the medical apparatus. The control unit receives the authorization signal from the main station and authorizes usage of the medical apparatus for a predetermined time period. The control unit determines at least one operations parameter of the medical apparatus after the elapse of the predetermined time period. The control unit also provides an invoice indicating the operations parameter and further indicating a fee based on that operations parameter.

These and other benefits of this invention will become clear from the following description by reference to the drawings.

BRIEF DESCRIPTION OF THE DRAWINGS

FIG. 6 is an alternative embodiment showing a single microprocessor in the combined system.

DESCRIPTION OF THE PREFERRED EMBODIMENT

Figure 1:
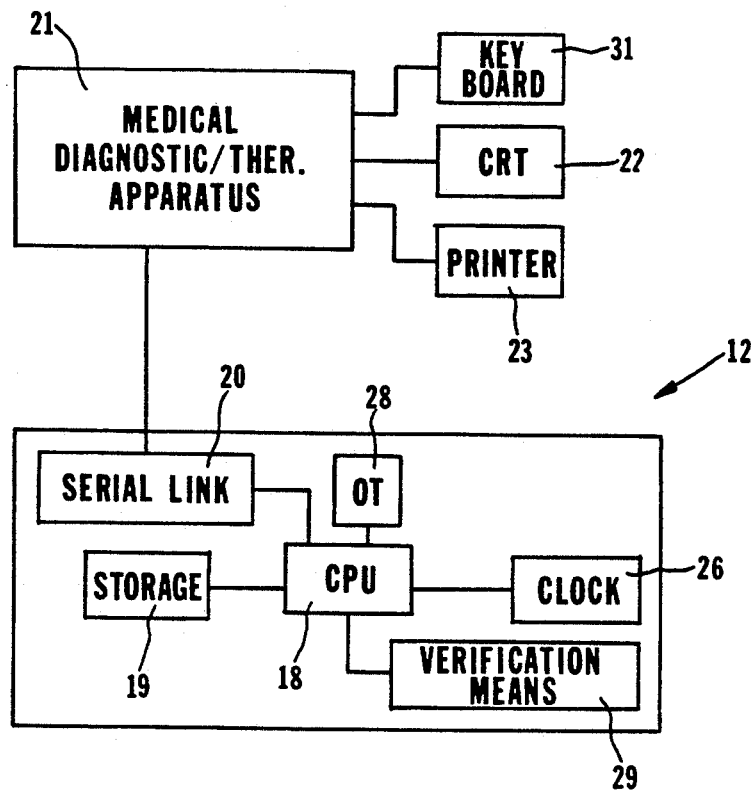
FIG. 1 is a schematic diagram of the device of the Medical Automatic Metering and Invoicing System invention operatively connected to a medical diagnostic or therapeutic apparatus.

FIG. 1 shows the automatic metering and invoicing device 12 of the present invention operatively connected to a medical diagnostic or therapeutic apparatus 21 which has a microprocessor, various output devices 22 and 23, and output driver software. Examples of such apparatus 21 include an electrocardiograph, phonocardiograph, CAT Scan, PET Scan, Radioisotope Scan and the like. These apparatus 21 generate information or data of value to the user in the forms of a hard copy output, electronic display and the like. The device 12 is further useable with other apparatus, including non-medical devices, which have hardware and software to generate and provide information of value to the user. Such an apparatus may have a variety of types of input hardware to acquire information; for example, it may have a modem for access to a remote data base. Further, the apparatus may have additional hardware and associated software to acquire and store third party billing information. The device 12 of the invention is connected to the medical apparatus 21 and receives information based on its operations. The device 12 also outputs signals to the medical apparatus 21 to activate its monitor 22 and printer 23 to provide an invoice.

The device 12 has a central processor (CPU) 18, an internal clock 26, an operations timer (TO) 28, memory or storage 19, and a code verification system 29. A serial link 20 interfaces the central processor 18 with the medical diagnostic or therapeutic apparatus 21 microprocessor. The central processor 18 is communicatively connected to the internal clock 26, operations timer 28 and memory 19 via a system bus. The design of these components are known in the art.

The memory 19, for example a ROM, comprises a permanent storage for the unit price of the procedures performed or information provided, and a non-volatile storage means for keeping count of the number of procedures or amount of information provided by the medical apparatus 21 during a predetermined time period. Examples of such non-volatile storage means include a disk memory, battery backed memory, core memory, or an EEPROM.

The central processor 18 has program logic (software) for determining an operating parameter (such as the number of procedures performed) of the medical apparatus 21 and for computing the cost of apparatus 21 usage based on the stored unit price of the procedures and the total number of procedures performed. These software elements provide a means for formatting an invoice indicating a fee for the use of the medical apparatus 21. These elements further cooperate to communicate the invoice to the medical apparatus 21 microprocessor via the serial link 20. The medical apparatus 21 microprocessor and its associated software further cooperate with the central processor 18 to permit transfer of invoice data to the output devices 22 and 23. The storage 19 further comprises a RAM to hold the formatted invoice for transmission to and manipulation by the output (printer) driver software of the medical apparatus 21. Transmission of the formatted invoice to the printer driver software is accomplished by additional program logic in the CPU 18.

FLOW DESCRIPTION 1: OPERATION PARAMETER DETERMINATION METHOD

The elapsed time of a diagnostic test, the event of test completion, and the patient's name, for example may be stored and used for invoice generation.

This method is described with respect to the system arrangement shown in FIG. 1 with two separate central processors communicatively connected by a serial link. A similar, but simpler methodology could be employed by the single processor system configuration shown in FIG. 6 and described below. Inter-processor communication over the serial link would be replaced by control software that successively accesses the various storage locations and performs the described actions in sequence.

1. Operator presses "start test" key on keyboard 31.

2. Central processor in medical apparatus detects key displacement and initiates diagnostic software program to perform the selected medical test. As a first step, software running on the central processor in the medical apparatus sends a request to the CRT 22 for the operator to enter the name of the patient. After the operator has typed it in through the keyboard 31, the processor collects and stores the name in temporary storage in the diagnostic apparatus 21.

3. Control software also directs the central processor in medical apparatus 21 to send a "test started" message over the serial link to the central processor in device 12. This message could consist of a pre-selected character or sequence of characters that the software programmer selected to represent the condition of "test started." Upon receipt of this message, the processor in 12 starts the operations timer 28 so that it can record the length of the procedure and sets a flag value in a particular location in storage 19 to indicate "test in progress."

4. Upon completion of the test procedure by the medical apparatus, its control software directs its central processor to send a "test completed" message over the serial link to the CPU18. This is a unique character or sequence of characters that is different from the "test started" message.

5. Upon receipt of the "test completed" message, the central processor in device 12 stops the operations timer 28 and interrogates it for the elapsed time, which is copied to a location in storage 19. The "test completed" message is also intepreted by the control software executing on CPU 18 to cause the CPU to increment a count of completed tests for invoicing purposes.

6. CPU 18 sends a "request for patient name" message to the medical apparatus processor via the serial link.

7. Medical apparatus processor sends a message over the serial link to CPU 18 that contains the patient's name, which is then stored in a location in storage 19.

FLOW DESCRIPTION 2: INVOICE FORMATTING AND COMMUNICATION METHOD

As discussed above in Flow Description 1, the operation parameters are maintained and accumulated in the storage 19.

1. At the end of a predetermined time period, or for example upon request of the user or invoicing entity, the device 12 under control of its software program recalls the accumulated parameters of the relevant time period and formats an invoice. This is accomplished by a section of software that intersperses headings and labels with the actual operational parameters and totalled parameters.

2. Total cost determination is accomplished by software in device 12 that directs the CPU 18 to recall the stored unit price data from storage 19. CPU 18 then multiplies the total number of procedures performed by their unit price for each type of diagnostic or therapeutic procedure that can be performed by the apparatus 21 and totals the individual costs.

3. Invoice printing is accomplished by cooperation of the two central processors using the serial link, and by printer driver software residing in storage in the medical apparatus 21. The CPU 18 in device 12 sends a message to the central processor in medical apparatus 21 that contains the full test of the formatted invoice. The apparatus CPU receives the message and stores in its own local storage until printing is complete. Control software in the medical apparatus directs the processor to send the invoice to the printer 23 through the printer driver software at a rate of one character at a time until the whole invoice has been sent. Then it directs the printer to eject the page so that the operator can remove it ans see that it is taken care of.

The device 12 is communicatively connected to the keyboard 31 of the medical apparatus 21. Upon installation of the device 12 to the medical apparatus 21, the installer enters an initiation code on the keyboard 31 which activates the medical apparatus 21 for a predetermined period of time.

During operation of the medical apparatus 21 for the predetermined time period, typically a one month, 30 day, 60 day or 90 day period, the central processor 18 determines one or more operation parameters (utilizing the system described above) of the medical apparatus 21 for that period and enters the parameter(s) in storage 19. The operation parameters preferably include the total operating time for the medical apparatus 21, the total number of operations performed on the medical apparatus 21 during the time period, the types of operations performed, and the average time for each operation. Other operating parameters may be indicated on the invoice depending upon the type of medical or other apparatus 21 being metered. (See Flow Sequence 1 for a description of parameter determination and storage process). At the end of the time period, the device 12 formats an invoice (also utilizing the above-described system) which indicates each operation parameter and further computes a fee based on the operation parameters (See Flow Sequence 2). Importantly, since the device 12 is communicatively connected to the monitor 22 and printer 23 of the medical apparatus 21, they are utilized to display and print the invoice. Additional hardcopy data output may be realized utilizing electromagnetic output such as a hard disk, floppy disk, tape means or the like.

The medical apparatus 21 user obtains the invoice from the printer 23 and sends it to the invoicing entity along with payment. Upon receipt of payment, the invoicing entity provides an authorization code, via telephone or other communication means, to the user. The user then enters the code to the device 12, utilizing the keyboard 31 of the medical apparatus 21, to activate the apparatus 21 for another predetermined period of time. In this manner, automatic metering, invoicing, and crediting are provided without the necessity of contact with the medical apparatus 21 by personnel from the invoicing entity.

Figure 2:
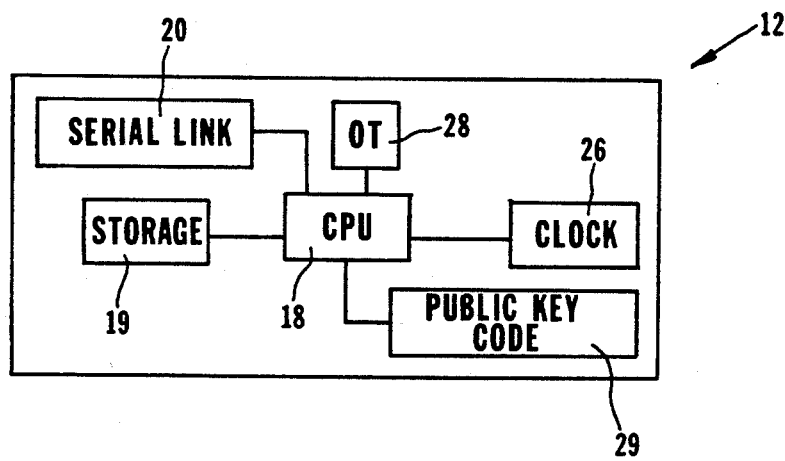
FIG. 2 is a schematic diagram of an embodiment of the control unit of the present invention.
Figure 3:
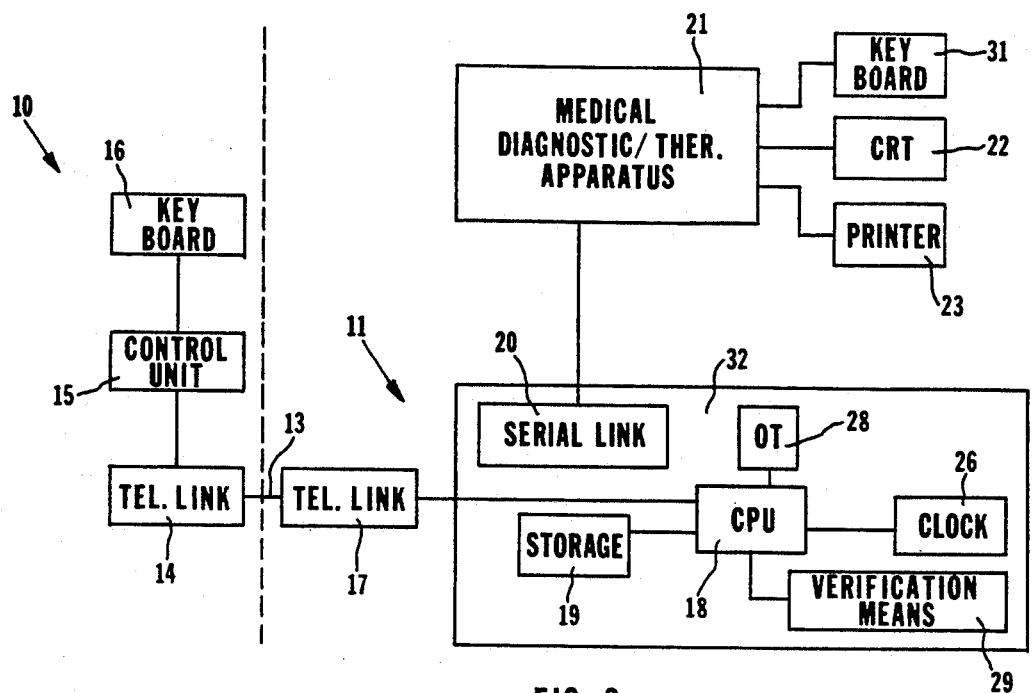
FIG. 3 is a schematic diagram of another embodiment of the device of the invention operatively connected to a medical apparatus.

The code confirmation system 29 verifies the code entered on the apparatus keyboard 31. Should an unauthorized code be entered in an attempt to circumvent the device 12, the code confirmation system 29 will detect it and terminate use of the medical apparatus 21. The confirmation system 29 ensures that the medical apparatus 21 will not be activated without prior payment of the invoice. A plurality of codes is useable to activate the medical apparatus 21 under a variety of billing scenarios. For example, one code may be transmitted and entered when the user has paid their account in full. This code will enable the medical apparatus 21 and cause the system 12 to clear all prior billing information. Another code may be used when the user has not paid their account in full for one or more billing periods. This code will enable the medical apparatus, but will also retain previous billing information for inclusion on the next invoice. Therefore, the invoicing entity may better control the use of the medical apparatus 21 in situations where a payment has been missed or where payment is made at various intervals. As shown in FIGS. 2 and 3, the confirmation system 29 may employ a Public Key Code, an NBS (National Bureau of Standards) System or another encryption scheme known in the art.

FIG. 3 shows another embodiment of the automatic metering and invoicing system of the present invention. This embodiment of the system comprises a main station 10 and a remote station 11. The main station 10 is located at the invoicing entity premises and the remote station 12 is located at the user premises and connected to the medical apparatus 21. The main station 10 has a transmission link 14 which is connected to a standard telephone line 13. A control unit 15 is connected to the transmission link 14 and has a keyboard 16. The control unit 15 is central processor-based and outputs an authorization signal which corresponds to a paid-up account with the invoicing entity. The authorization signal is transmitted over the telephone line 13 via the transmission link 14. The control unit 15 of the main station 10 may additionally have the capability to receive information on the functioning of the medical apparatus 21 and/or to transmit control signals thereto.

FIG. 3 also shows the remote station 11 and the medical diagnostic or therapeutic apparatus 21. The remote station 11 is connected to the medical apparatus 21 and receives information based on its operations. The remote station 11 also outputs signals to the medical apparatus 21 to provide an invoice via its printer 23. The remote station 11 comprises a control unit 32 and a reception link 17 which is connected to the telephone line 13 at the opposite end from the main station 10. The transmission link 17 receives the authorization signal transmitted from the main station 10. The control unit 32 is connected to the reception link 17 and receives the initiation signal therefrom. The control unit 32, based upon reception of the initiation signal, enables or authorizes use of the medical apparatus 21 for the predetermined period of time. The control unit 32 is constructed and arranged as disclosed above.

Referring to FIG. 6, an alternative embodiment of the device is shown having a single microprocessor in the combined system, with the metering and invoicing components connected directly to the system bus in the medical apparatus. The extended system bus effectively replaces the serial link as the communications means. The resultant unitary and self-contained apparatus with a shared microprocessor, has the capability to do both medical diagnostic procedures, and automatic metering and invoicing. The metering and invoicing components can be integrated into the apparatus circuitry, as shown, or provided as a modular add-in.

Figure 4:
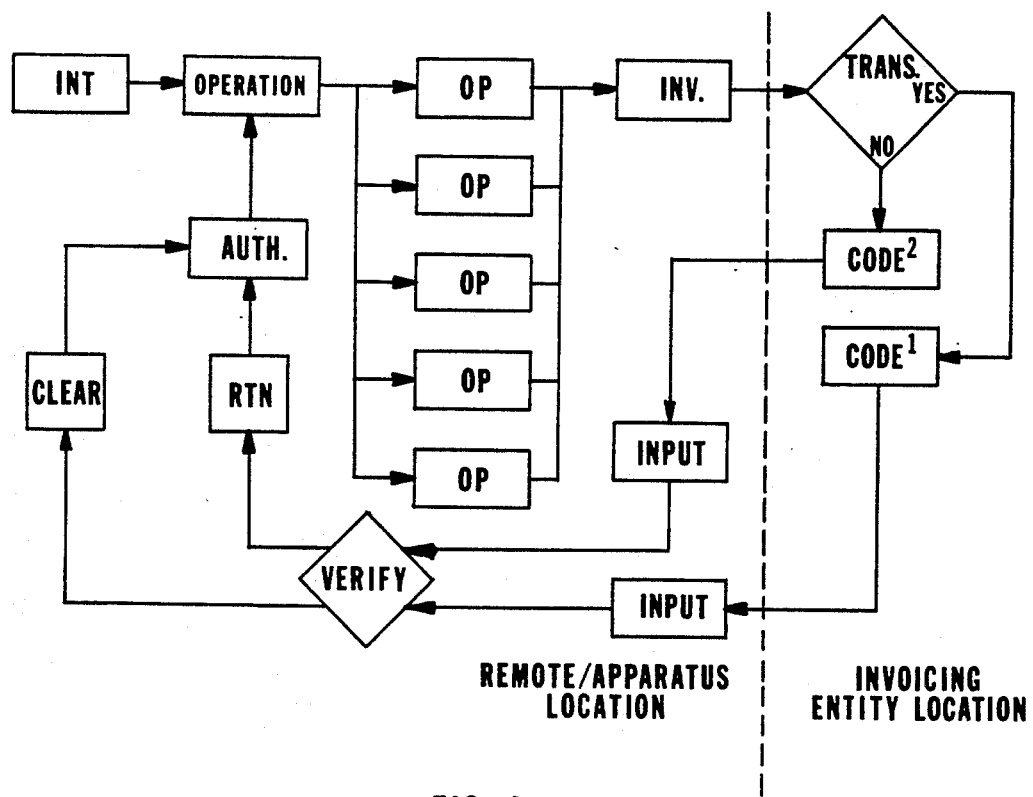
FIG. 4 is a flow chart of the method of the invention.
Figure 5:
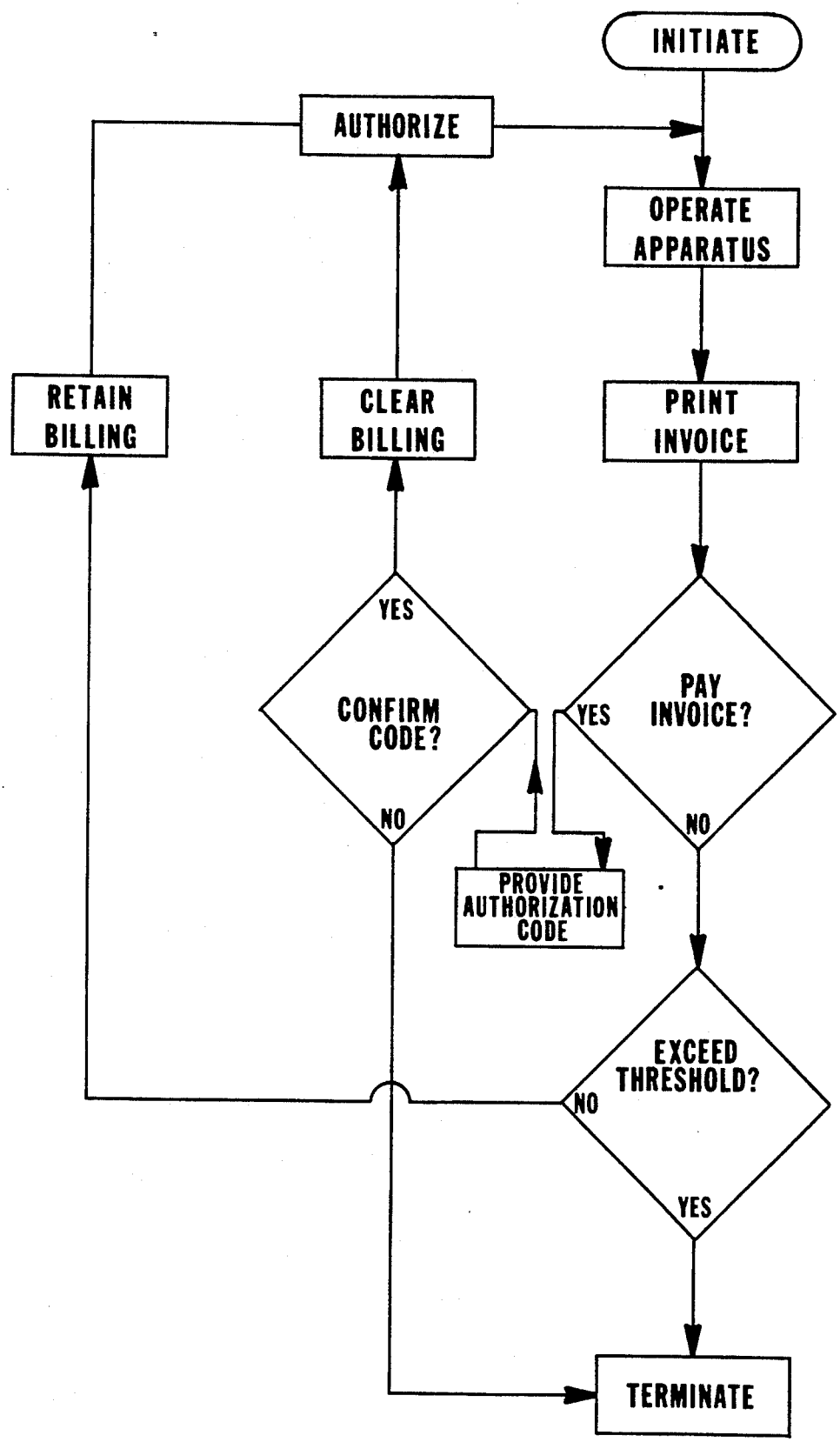
FIG. 5 is a data flow map of the method of the invention.

Referring to the flow chart shown in FIG. 4 and the data flow map shown in FIG. 5, the method of the present invention is for metering, invoicing and crediting the user of medical or other apparatus at a remote location. The method of the invention is cyclical and repeatable. The system is first initialized to begin an initial metering and invoicing cycle. The initialization typically occurs at the user premises and is performed by the installer entering an initiation code (INT). The initiation code enables the medical apparatus for operation (OPERATE) during a predetermined time period, typically one billing period. The predetermined time period of operation may be extended in situations where it is important to avoid medical apparatus shutoff.

A plurality of operation parameters (OP) are generated by the operation of the medical apparatus during the predetermined time period. At the end of the time period, an invoice (INV) is automatically provided at the location of the medical apparatus. The invoice indicates the operation parameters and further indicates a fee based on one or more of the operation parameters. The operations parameters may include, but are not limited to the total operating time for the medical apparatus during the delineated time period, the total number of operations performed on the apparatus, the types of operations performed on the apparatus, and the average time for each operation.

If payment is made (TRANS) on the invoice, an authorization code (CODE 1) is provided (INPUT) from the invoicing entity location to the medical apparatus location via a telephone or other communications link. Such input may be either direct or through an operator intermediary. The authorization code (CODE 1) enables operation of the apparatus (AUTH) for an additional time period and clears (CLEAR) previous invoice indications. If payment is not made, a different authorization code (CODE 2) may be provided which enables operation of the apparatus (AUTH) and retains (RTN) previous billing indications. Thus, the method provides flexibility in billing and crediting options. In any case, provision of an authorization code to the apparatus is made only at the discretion of the invoicing entity, either subsequent to payment of the invoice or through an alternative arrangement.

Preferably, the input authorization code is verified (VERIFY) at the apparatus location subsequent to input. Confirmation of the code ensures the apparatus is enabled only after payment (TRANS) of the invoice. Verification is accomplished by stamping the invoice with a tamper-proof date and by comparing the input code (CODE 1 or 2) with a consistency code such as a public key code. Also, and in the event payment is not made on the invoice, it may be determined whether nonpayment is repeated or has exceeded a threshold. If so, medical apparatus 21 operation may be automatically terminated by simply withholding transmission of the authorization code. Further procedures may then be implemented.

In summary, the devices and methods of the present invention provide a universally adaptable and fully automatic metering and invoicing of a medical or other apparatus at a remote location utilizing the output means of the apparatus itself.

As many changes are possible to the embodiments of this invention utilizing the teachings thereof, the descriptions above, and the accompanying drawings should be interpreted in the illustrative and not the limited sense.

That which is claimed is:

1. A method for automatically invoicing and crediting a user for the use of an apparatus form a predetermined location, comprising the steps of:
   a. providing an apparatus at a remote location for performing a predetermined function, said apparatus having a printer;
   b. providing an authorization code to the apparatus at the remote location, said authorization code enabling operation of the apparatus for a predetermined time period;
   c. automatically determining at least one operation parameter based on the use of the apparatus during said predetermined time period, via a processor having storage;
   d. calculating a fee based on said operation parameter subsequent to said predetermined time period via said processor;
   e. communicating said fee to said printer via said processor through communication device; and
   f. providing an invoice at the remote apparatus location utilizing said printer, said invoice indicating said fee.

2. The method of claim 1, wherein said authorization code is provided to the remote apparatus location via a telephone link.

3. The method of claim 1, wherein said steps are cyclical and repeatable, and wherein a repeated provision of said authorization code to the apparatus clears previous said invoice fee.

4. The method of claim 1, wherein said steps are cyclical and repeatable, and wherein a repeated provision of said authorization code to the apparatus retains previous said invoice fee.

5. The method of claim 3, wherein provision of said authorization code to the apparatus is repeated subsequent to payment of said invoice.

6. The method of claim 4, wherein provision of said authorization code to the apparatus is repeated subsequent to payment on said invoice.

7. The method of claim 1, wherein said authorization code is verified at the remote apparatus location prior to said enabling.

8. The method of claim 7, wherein said verification is accomplished by utilizing an encryption scheme.

9. The method of claim 8, wherein said encryption scheme is a public key code.

10. The method of claim 1, wherein said predetermined time period is a common business invoicing period.

11. The method of claim 1, wherein said at least one operation parameter is the total operating time for the apparatus.

12. The method of claim 1, wherein the apparatus is useable in discreet operation cycles and wherein said at least one operation parameter is the total number of operations performed.

13. The method of claim 1, wherein the apparatus is useable for a plurality of types of operations and wherein said at least one operation parameter is the type of operations performed.

14. The method of claim 1, wherein the apparatus is useable in discreet operation cycles and wherein said at least one operation parameter is the average time for each operation.

15. The method of automatically invoicing the user of a medical apparatus which is usable in discreet operation cycles having a central processing unit and a printer, and crediting the user from a distant location, comprising the cyclical and repeatable steps of:
   a. providing an authorization code to the apparatus from the distant location;
   b. verifying, said authorization code at the apparatus location, said verifying enabling the apparatus for operation;
   c. delineating a time period during which the apparatus is used;
   d. compiling a number of discreet operation cycles performed by the apparatus during said time period, via a processor having non-volatile storage and permanent storage;
   e. delineating a unit price for each operation cycle and entering said unit price in said permanent storage;
   f. calculating, via said processor, a fee for apparatus usage during said time period based on said unit price and said number of operation cycles performed;
   g. formatting an invoice indicating said fee, via said process;
   h. communicating said invoice format to the apparatus central processing unit via a communication device; and
   i. providing said invoice, via the apparatus printer, whereby said authorization code is provided subsequent to payment on said invoice.

16. An automatic metering and invoicing system for use with an apparatus, the apparatus having input means and a printer, and which is usable in discreet operation cycles, comprising:
   a. means to receive an authorization code;
   b. means to verify said authorization code, said verification means being communicating connected to said reception means, said verifying means authorizing usage of the apparatus for a predetermined time period;
   c. non-volatile storage means, communicatively connected to the apparatus, for determining the number of operation cycles during said predetermined time period; and
   d. means, communicatively connected to said non-volatile storage means and to the apparatus printer, to provide an invoice indicating a fee based on said number of operation cycles executed, via the apparatus printer, said means to provide an invoice including a system central processor having program logic means, and permanent storage means for holding a unit price for each operation cycle, said program logic means transmitting said invoice to the apparatus printer via communication device.

17. The automatic metering and invoicing system of claim 16, wherein said means to receive an authorization code comprises a serial link, and a system central processing unit, said central processing unit being communicatively connected to said serial link and to the input means of the apparatus.

18. The automatic metering and invoicing system of claim 16, wherein said verification means is a public key code and an interconnected system central processing unit.

19. The automatic metering and invoicing system of claim 16, wherein said determination means comprises storage and an interconnected system central processing unit having programmed logic means.

20. The automatic metering and invoicing system of claim 16, wherein said means to provide an invoice comprises an interconnected storage, serial link, and a system central processing unit having programmed logic means communicatively connected to the printer of the apparatus.

21. The automatic metering and invoicing system of claim 16, wherein the apparatus performs a medical procedure and comprises a CPU, a monitor, and a printer for generating data relating to the medical procedure.

* * * * *